(12) United States Patent
Dietrich

(10) Patent No.: US 12,327,225 B2
(45) Date of Patent: Jun. 10, 2025

(54) WASTE AUDITING SYSTEM USING SERVICE VEHICLES

(71) Applicant: PRAIRIE ROBOTICS INC., Regina (CA)

(72) Inventor: Sam Philip Dietrich, Regina (CA)

(73) Assignee: Prairie Robotics Inc.

( * ) Notice: Subject to any disclaimer, the term of this patent is extended or adjusted under 35 U.S.C. 154(b) by 460 days.

(21) Appl. No.: 17/542,768

(22) Filed: Dec. 6, 2021

(65) Prior Publication Data
US 2022/0180330 A1    Jun. 9, 2022

Related U.S. Application Data

(60) Provisional application No. 63/122,596, filed on Dec. 8, 2020.

(51) Int. Cl.
| | |
|---|---|
| *G06Q 10/30* | (2023.01) |
| *B65F 3/04* | (2006.01) |
| *G01S 17/89* | (2020.01) |
| *G06Q 30/04* | (2012.01) |
| *G06T 7/00* | (2017.01) |
| *G06T 7/20* | (2017.01) |
| *G06T 7/50* | (2017.01) |
| *G06T 7/70* | (2017.01) |
| *G06V 10/74* | (2022.01) |
| *G06V 20/56* | (2022.01) |

(Continued)

(52) U.S. Cl.
CPC ............ *G06Q 10/30* (2013.01); *B65F 3/041* (2013.01); *G01S 17/89* (2013.01); *G06Q 30/04* (2013.01); *G06T 7/0002* (2013.01); *G06T 7/20* (2013.01); *G06T 7/50* (2017.01); *G06T 7/70* (2017.01); *G06V 10/761* (2022.01); *G06V 20/56* (2022.01); *B65F 2003/0269* (2013.01); *G01P 13/00* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 5,410,481 A * | 4/1995 | Kriz ....................... | G05D 1/027 701/23 |
| 9,754,382 B1 | 9/2017 | Rodoni | |

(Continued)

*Primary Examiner* — James M Anderson, II
(74) *Attorney, Agent, or Firm* — Ryan W. Dupuis; Michael R. Williams; Ade & Company Inc.

(57) ABSTRACT

A waste management system audits waste collected by a service vehicle from clients. The system has a camera capturing images of waste collected in the collection hopper of the service vehicle. A controller compares the waste images to event criteria to determine if a service event has occurred and then associates a client with the service event, in which the client is identified by an accompanying identification system. The controller then identifies one or more waste images as event image data associated with the service event subsequent to determination that the service event has occurred and compares the event image data to content criteria to make an inference regarding a content of the collected waste. The inference is stored in association with the identified client and can trigger further action, for example notifications to the client or automated adjustments to invoicing to the client.

29 Claims, 5 Drawing Sheets

(51) Int. Cl.
*B65F 3/02* (2006.01)
*G01P 13/00* (2006.01)

(56) References Cited

U.S. PATENT DOCUMENTS

| | | | |
|---|---|---|---|
| 2008/0061977 A1* | 3/2008 | Maruca | G06Q 10/0637 |
| | | | 340/572.1 |
| 2017/0243363 A1* | 8/2017 | Rodoni | G06T 7/90 |
| 2018/0231388 A1* | 8/2018 | Rodoni | G01C 21/3415 |
| 2019/0322450 A1* | 10/2019 | O'Brien | B65F 1/1426 |
| 2020/0034785 A1* | 1/2020 | Romano | G06N 20/00 |
| 2020/0247609 A1* | 8/2020 | Maroney | B65F 3/04 |
| 2021/0107537 A1* | 4/2021 | Ross | B61L 25/026 |

* cited by examiner

WASTE AUDITING SYSTEM USING SERVICE VEHICLES

This application claims the benefit under 35 U.S.C. 119(e) of U.S. provisional application Ser. No. 63/122,596, filed Dec. 8, 2020.

FIELD OF THE INVENTION

The present invention relates to a system for evaluating contents of waste collected from individual clients by a service vehicle, and a method of use of the system to make inferences regarding the contents of the collected waste at each one of a plurality of client locations serviced by the service vehicle.

BACKGROUND

Recyclable waste materials are commonly collected from individual residential clients using waste containers associated with the client respectively that can be dumped into the waste containment area of a service vehicle. Recyclable waste materials can produce several streams of valuable materials that can be reused, however, considerable costs can be incurred and large batches of valuable materials streams can be contaminated with by a small quantity of undesirable materials mixed into the waste. It is desirable to track the source of undesirable materials to pass on costs to the clients that are responsible and to identify trends to minimize future contamination of the waste materials.

U.S. Pat. No. 9,754,382 by Rubicon Global Holdings, LLC discloses one example of a waste management system implementing remote auditing by monitoring waste collected by a service vehicle. The system requires sensors to be installed on the service vehicle to monitor operation of the vehicle such as the movement of the lift arms to determine when a client is being serviced; however, the requirement for interaction of the sensor with an operating component of the vehicle can make the system to be difficult to adapt to a variety of different vehicle types.

SUMMARY OF THE INVENTION

According to one aspect of the invention there is provided a waste management system for auditing waste collected by a service vehicle from a plurality of clients, the system comprising:

a camera arranged to capture waste images of the waste collected by the service vehicle;

an identification system arranged to identify a client being serviced by the service vehicle among the plurality of clients;

a controller including a processor and a memory storing programming instructions thereon arranged to be executed by processor such that the controller is arranged to:

(i) compare the waste images to event criteria to determine if a service event has occurred;

(ii) associate the client identified by the identification system with the service event;

(iii) identify one or more waste images as event image data associated with the service event subsequent to determination that the service event has occurred;

(iv) compare the event image data to content criteria to make an inference regarding a content of the collected waste; and (v) store the inference in association with the identified client.

Use of images captured by the camera for both (i) determination of when a service event has occurred and (ii) analysis of the waste contents at each service event provides an effective system for auditing waste, while minimizing hardware requirements. The resulting system can thus be implemented at minimum cost and is simple to maintain. Use of images of the collected waste as a primary source of data, also makes the system highly adaptable to a variety of different service vehicles.

Preferably the camera is arranged to capture the waste images such that each waste image includes a waste receiving area of the service vehicle and a peripheral area in an adjacent field of view relative to the waste receiving area. In this instance, the event criteria may include identification of an object within the peripheral area by the controller. When the service vehicle includes a loading arm which unloads the waste from waste containers into the waste receiving area of the service vehicle, the object identified in the peripheral area may be the loading arm of the service vehicle, a currently unloading container among the waste containers.

The event criteria may include (i) determining a start of the service event based upon emergence of the object within the peripheral area, and/or (ii) determining an end of the service event based upon disappearance of the object within the peripheral area.

The event criteria may include a change threshold applied to a comparison of the waste receiving area of sequential images among the waste images captured by the camera.

When the camera is arranged to capture the waste images from a waste receiving area of the service vehicle, the controller may be arranged to (i) identify waste objects within the waste images, (ii) track the identified waste objects from a previous service event within the waste receiving area, and (iii) distinguish current identified waste objects associated with the current service event from the identified waste objects of the previous service event. In this instance, the event criteria may include a change threshold applied to a comparison of identified waste objects of sequential images among the waste images captured by the camera.

When the controller is arranged to identify objects within the waste images, the content criteria may include a similarity comparison of each identified object to a plurality known objects stored on the controller and the controller may be arranged to make the inference based on the similarity comparisons of all identified objects.

The controller may be further arranged to (i) measure a quality of the identified object by comparison to the known objects stored on the controller, and (ii) use the measured quality in making the inference regarding the content of the collected waste. When the known objects comprise approved objects, the controller may be arranged to make a positive inference that the content of the collected waste is approved if an amount of the identified objects matching the approved objects by similarity comparison exceeds an approval threshold. The controller may be further arranged to (i) assign identified objects that do not meet a similarity comparison to the known objects as rejected objects, and (ii) make a negative inference that the content of the collected waste is rejected if an amount of the identified objects matching the rejected objects by similarly comparison exceeds a rejection threshold.

When the known objects comprise rejected objects, the controller may be arranged to make a negative inference that the content of the collected waste is rejected if an amount of the identified objects matching the rejected objects by similarly comparison exceeds a rejection threshold.

The controller may be arranged to identify objects by determining object boundaries within the waste images to determine shape of the object.

The system may further include a secondary sensor arranged to map three dimensional surfaces within a waste receiving area of the service vehicle from which the waste images are captured. In this instance, the controller may be arranged to use the mapped three dimensional surfaces from the secondary sensor in defining the identified objects within the waste images. For example, the secondary sensor may comprise LIDAR.

The similarity comparison is arranged to determine one of the identified objects as one of the known objects if brand imagery is identifiable on the identified object that corresponds to known imagery associated with the known object.

When the camera is arranged to capture the waste images from a waste receiving area of the service vehicle, the controller may be arranged to (i) identify waste objects within the waste images, (ii) distinguish current identified waste objects associated with the current service event from the identified waste objects of the previous service event, and (iii) apply the content criteria only to the currently identified waste objects associated with the current service event in making the inference regarding the content of the collected waste.

The controller may be further arranged to track a position of the identified waste objects from a previous service event within the waste receiving area in order to distinguish the currently identified waste objects from the identified waste objects of the previous service event.

The controller may be arranged to identify waste objects within the waste images by comparison to known objects stored on the controller, and use known weight and/or known volume associated with the known objects that are identified in making the inference regarding the content of the collected waste.

When the system includes a load sensor arranged to measure a weight of the waste collected by the service vehicle, the controller may be arranged to use the measured weight in making the inference of the content of the collected waste.

Preferably, the inference includes a measure of a purity of the collected waste and the controller is arranged to compare the measured purity to a purity threshold to classify the service event according to the measure of purity.

The controller may be further arranged to (i) identify objects within the waste images and compare the identified objects to the content criteria in measuring the purity, (ii) compare the identified objects to known critical objects stored on the controller, and (iii) supersede the classification with a rejection if one of the identified objects is determined to be one of the known critical objects.

The identification system may include a vehicle location identifier so as to be arranged to identify the client being serviced by comparing the identified location of the vehicle to known client locations of the clients.

The identification system may include a vehicle sensor arranged to sense movement information related to the service vehicle so as to be arranged to identify the client by comparison of the movement information to a known service route stored on the controller. The vehicle sensor may include one or more wheel sensors arranged to detect wheel movement of wheels of the service vehicle, and/or an accelerometer to detect vehicle accelerations and decelerations.

When the camera is arranged to capture the waste images such that each waste image includes a waste receiving area of the service vehicle and a peripheral area in an adjacent field of view relative to the waste receiving area, the identification system may be arranged to identify landmarks in the peripheral area of the waste images from known landmarks associated with a known service route stored on the controller in order to determine the client being serviced by the service vehicle.

The controller may be arranged to make the inference so as to include a quantity measure and a quality measure relating to the collected waste, and generate a variable waste collection invoice based upon the quantity measure and the quality measure of the inference.

According to another aspect of the present invention, there may be provided a non-transitory computer readable medium containing computer executable programming instructions for executing a method of performing an audit of waste retrieved by a service vehicle, the method comprising:

continuously recording image data during waste collection services;

using controller capable of analyzing image data to separate collected data into independent collection events;

showing this data to a user;

receiving feedback from the user based on the data displayed; and generating a recommendation regarding the data based on the feedback.

According to another aspect of the present invention there may be provided a system for providing a refuse management app, comprising (also need non-transitory computer version):

a locating system to identify the physical coordinates of the refuse collection vehicle;

an optical sensor configured to conditionally record image data during waste collection services when it automatically detects a refuse service event;

an input system capable of receiving input for non service events;

a controller in communication with the locating system, optical sensor and input system, the controller being configured to:

receive requests for refuse service events to be performed by the refuse collection vehicle;

track movement of the refuse collection vehicle during refuse service activities;

record both service events via the optical sensor configured to automatically detect them and non-service events via operator input;

provide feedback to the input system on both completed and remaining refuse collection events, and provide navigation feedback on the input system from the location system's currently estimated position to the next waste service event.

BRIEF DESCRIPTION OF THE DRAWINGS

Some embodiments of the invention will now be described in conjunction with the accompanying drawings in which.

DETAILED DESCRIPTION

Figure 1:
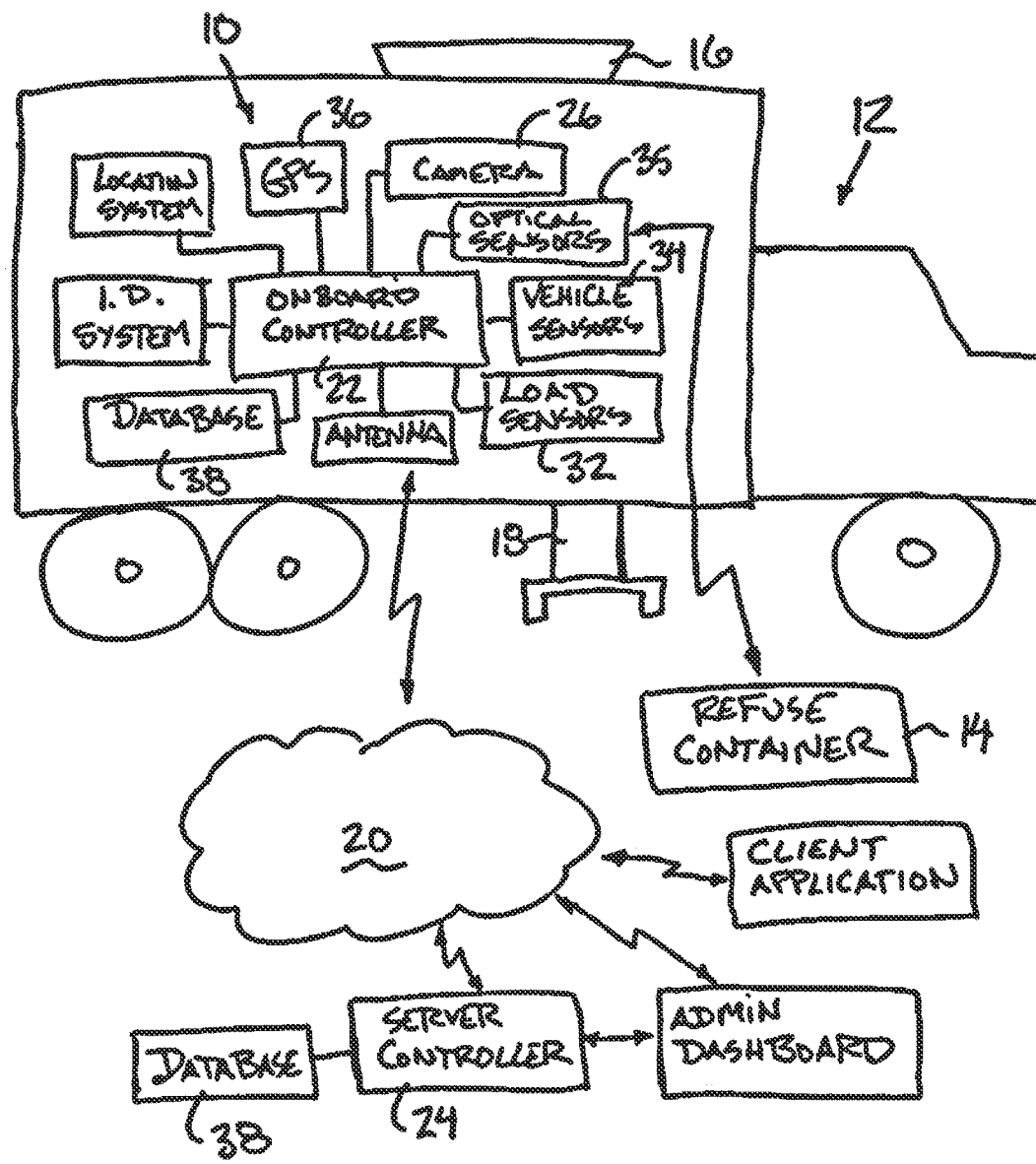
FIG. 1 is a schematic representation of the waste management system.
Figure 2:
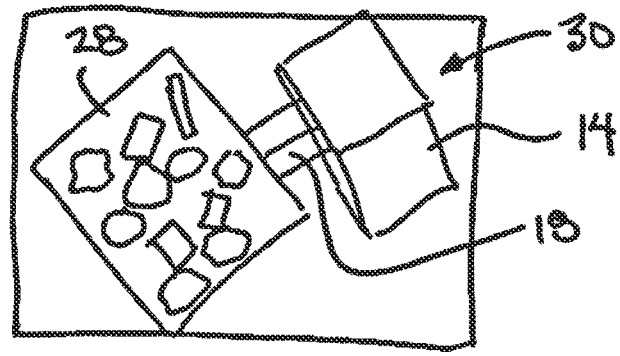
FIG. 2 is a schematic representation of one of the waste images captured by the system.

Referring to the accompanying figures, there is illustrated a waste management system generally indicated by reference numeral 10. The system 10 is particularly suited for use with a waste collection service vehicle 12 which collects waste from a plurality of client waste receptacles 14 containing client waste therein at respective client locations distributed along a service route. The waste typically comprises multiple streams of different recyclable materials which are collectively mixed within the waste receptacle for subsequent separation into different streams of recyclable materials at a downstream sorting facility subsequent to collection by the service vehicle.

The service vehicle includes a waste receiving area 16 in the form of a hopper having an open top end at the top of the vehicle and a load arm 18 arranged for grabbing an individual client waste receptacle 14 to lift and invert the container above the waste receiving area 16 of the vehicle to dump contents from the waste receptacle into the waste receiving area of the vehicle. A compaction mechanism is typically operated at the waste receiving area for compacting the waste after collection from an individual waste receptacle. Dumping contents from one individual waste receptacle 14 into the waste receiving area 16 is considered to be a single service event within the context of the present invention.

The system 10 is at least partly mounted onto the service vehicle. The system includes a controller comprised of one or more computing devices having a respective processor and programming instructions stored on an associated memory to be executed by the processor for performing the various functions described herein. The various computing devices may be located entirely on the service vehicle, or distributed in part on the service vehicle and in part at a remote server in communication with the computing devices on the service vehicle over a wireless communications network 20. The various steps for determination of a service event and subsequent analysis of image data to make inferences regarding the contents of the waste as described in the following may be accomplished at either one of the computing device on the service vehicle or the computing device on the server.

In the illustrated embodiment the system 10 comprises an onboard computer device 22 supported on the service vehicle, and a central computing device 24 defining a remote central server in communication with the onboard device 22 over the wireless network 20.

The system 10 further comprises a camera 26 supported on the service vehicle in communication with the onboard controller 22. The camera 26 is arranged to capture waste images containing image data related to the collected waste. Specifically, the camera may be mounted above the waste receiving area 16 such that the field-of-view of the camera encompasses the entirety of the waste receiving area 16 as well as a surrounding peripheral area corresponding to an adjacent portion of the field-of-view of the camera. Each waste image thus includes image data relating to the receiving area 28 and image data relating to the peripheral area 30 for use as described further below.

The system 10 further includes various additional sensors for collecting additional data on the service vehicle. The additional sensors may include a load sensor 32 operatively connected to the load arm 18 or the waste receiving area 16 for example for measuring the weight of the waste collected from each individual waste receptacle 14 corresponding to a service event.

The additional sensors on the vehicle also include vehicle movement sensors 34 which may include wheel sensors for detecting the stop and start motion of the wheels and/or an inertial measurement unit having accelerometers measuring accelerations along one or more axes. The vehicle movement data collected can be used in cooperation with a known route stored on the vehicle to determine position of the vehicle along the route.

Additional optical sensors 35 including LIDAR or other scanning tools for mapping a three dimensional shape of the contents of the waste receiving area of the vehicle may also be supported on the vehicle in communication with the onboard controller.

Additional sensors may further include a GPS device 36 capable of measuring the GPS coordinates of the vehicle and communicating the location data to the controller.

One or more databases 38 are also provided (i) on the service vehicle in communication with the onboard controller 22, and/or (ii) at the location of the server in communication the central server device 24. The databases include various data thereon including event criteria used for determination of a service event, and content criteria used for making inferences regarding the content of the collected waste as described below.

Some of the various criteria may include stored lists of known waste objects which are either known to be approved for recycling or known to be rejected objects which cannot be recycled. The stored known objects may also include critical objects in which determination of a single critical object within the waste associated with a service event would deem the entire collected waste from that service event as ineligible for recycling.

Other relevant information stored on the databases includes known service route information together with known client locations along the route, known landmarks which may be identifiable in the peripheral area 30 of the collected waste images or other identifiable objects within the peripheral area 30 of the waste images such as identifying an individual waste container as an object within the waste images or identifying a portion of the load arm 18 of the service vehicle as an object within the waste images which may be associated with identification of a service event as described below.

The system 10 operates by collecting various data as the service vehicle drives along the respective service route in the usual manner. As the vehicle stops at each client location and collects the waste from the respective client waste receptacle 14 at the client location, a continuous stream of waste images is captured by the camera and recorded by the onboard controller 22. The images may be a stream of periodic still images or a continuous video stream.

The onboard controller continuously analyses the captured images and triggers the start and end of individual service events by comparing the collected image data to relevant event criteria which determines which collected waste images are associated with a particular service event.

In one instance, the controller analyses the peripheral area 30 of each waste image and compares identified objects in the peripheral area to recognized peripheral objects stored on the controller. The controller defines the start of a new service event when one of the peripheral objects is identified as a waste receptacle or a portion of the load arm indicating loading of a new waste receptacle into the waste receiving area of the vehicle. Alternatively, the start of a service event may be triggered by the disappearance of the waste receptacle or the load arm from the peripheral area instead of the emergence of the object in the image. The end of each service event is determined by identification of the start of the next service event. All images collected between the start and end of the service event can be subject to further analysis of the waste receiving area 28 of the images to make judgements about the contents of the waste collected within the associated service event.

In a further embodiment, the controller may instead analyse the image data associated with the receiving area 28 in each waste image. The controller may compare sequential images to identify if new waste has been placed within the waste receiving area of the vehicle to determine the start of a new service event if the waste content within the waste images changes by an amount greater than a corresponding threshold amount. The controller may be further arranged to identify individual waste objects within each waste image and track the position of the objects within the waste receiving area 28 of the images from each image to the next waste image in the sequence. In this manner, the controller may be arranged to seek new identified objects appearing in any given waste image associated with a service event relative to a previous image so that only the quantity or overall amount of new identified objects are compared to the threshold amount in order to determine if a new service event has begun.

In either instance the image analysis of the waste images involves comparing the image data to corresponding event criteria to determine the start of a new service event. All waste images captured until the determination of the start of the next service event are associated with the defined service event.

Figure 3A:
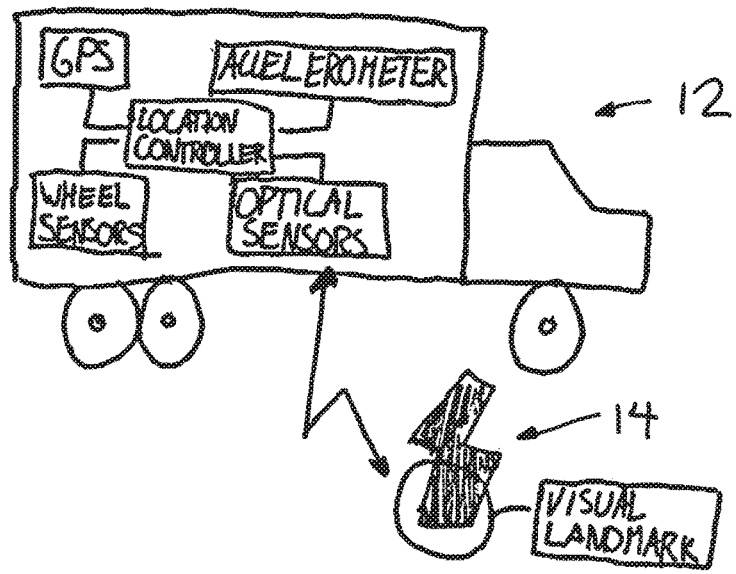
FIG. 3A is a schematic representation of the service vehicle relative to a waste receptacle and FIG. 3B is a flow chart illustrating the steps taken by the location system to identify the location of the service vehicle.
Figure 3B:
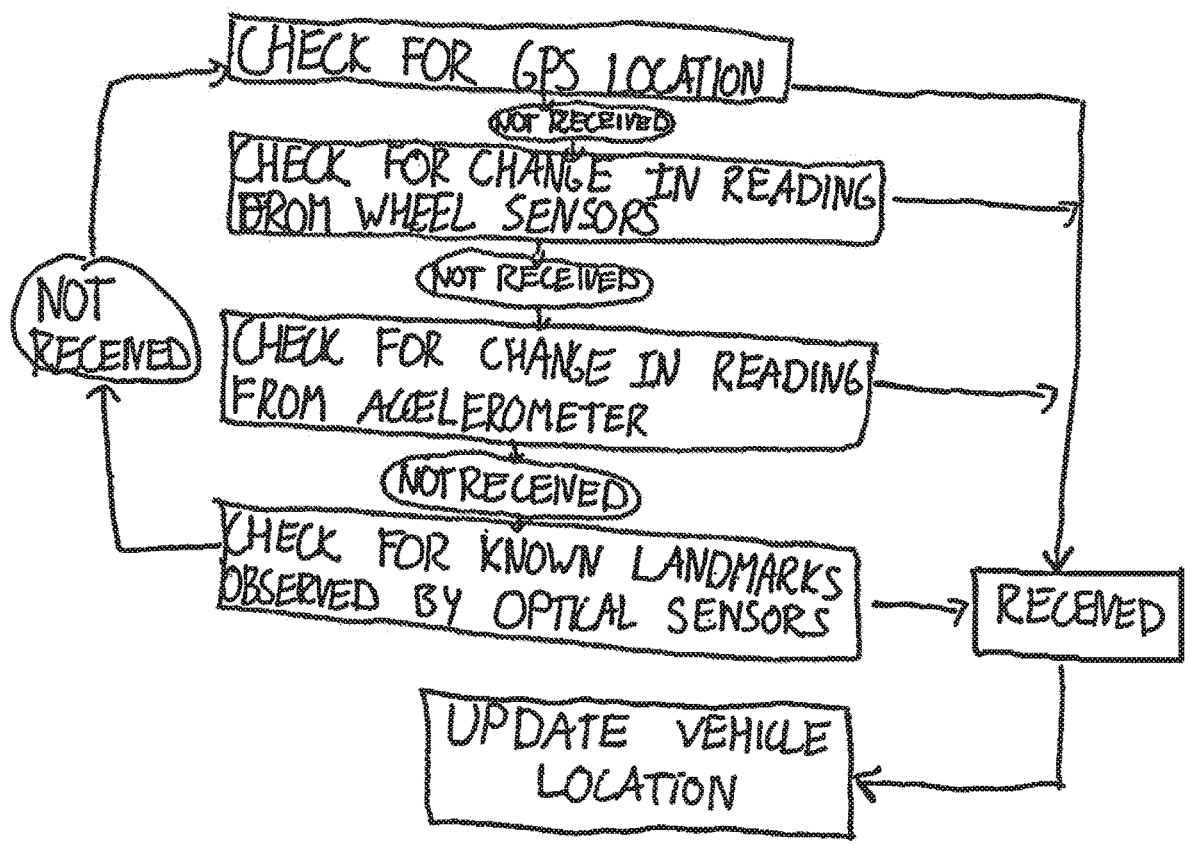

Once a service event has been identified, the controller seeks to pair the service event with a location, and more particularly with a particular client along the service route associated with that client location. As shown in FIG. 3B, a location system according to the waste management system 10 initially seeks data from the GPS sensor 36 to determine the vehicle location. Once the vehicle location is known, the vehicle location can be fed into the identification system of the onboard controller to associate the determined location with a known client along the service route. If GPS location is not available, the controller can monitor data from wheel sensors or an accelerometer to determine when the vehicle has started or stopped motion for matching the stop and start vehicle motion pattern to known route information and thereby determine the location of the vehicle. Landmarks may be observed in the peripheral area 30 of the waste images to further validate the location of the vehicle along a known service route when the landmarks are known objects along the known route. Identifying the location of the client related to the previous service event together with the known service route can be further used to assess the location of the vehicle.

Figure 4A:
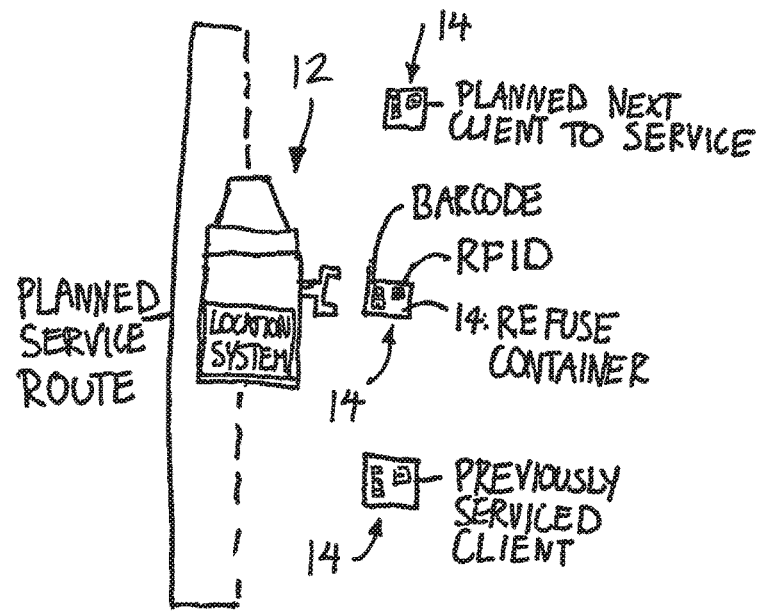
FIG. 4A is a schematic representation of the service vehicle relative to a plurality of waste receptacles and FIG. 4B is a flow chart illustrating the steps taken by the identification system to identify the client associated with a service event using the location of the service vehicle from the location system.
Figure 4B:
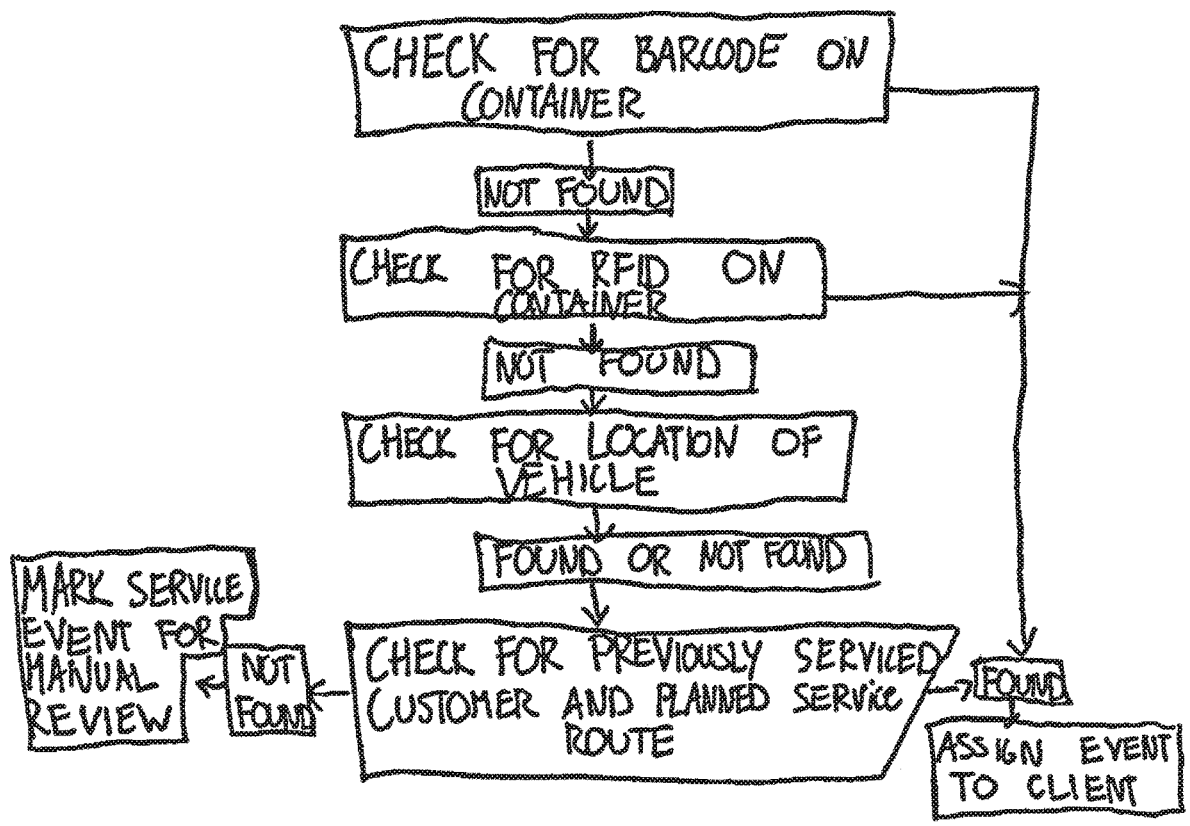

Once the vehicle location is known, the location can be input into the controller which further accesses a known client list to identify the client. The steps of the identification system are shown in FIG. 4B. In some instances, the waste container itself may include identifying information such as a barcode or RFID tag which can be identified by corresponding sensors on the service vehicle and in communication with the onboard controller. Such identifying information can be used to immediately identify the client associated with a service event. Alternatively the vehicle location together with the known service route information can be used to determine the client location. Finally, simply keeping track of the stops along a known route may be used to identify the client if all other identification means are unavailable. Once the client is known, the client identification is stored together with the waste images identified with the service event on the controller.

Figure 5A:
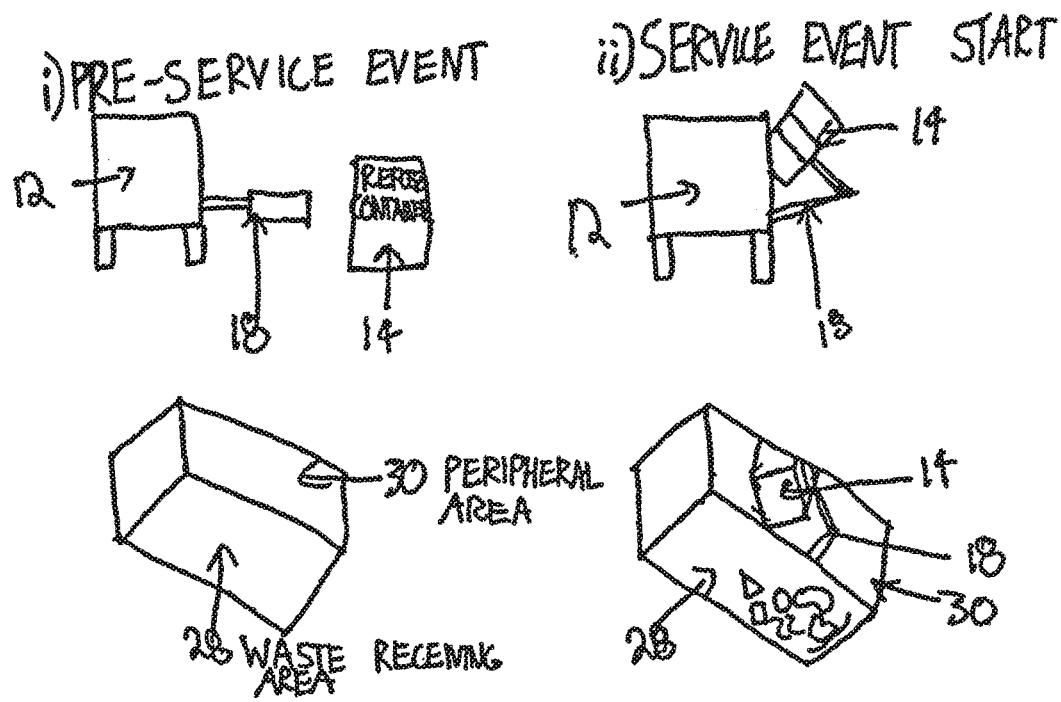
FIG. 5A is a schematic representation of the waste receiving area of the service vehicle corresponding to different steps of a service event of a waste receptacle collected by the service vehicle and FIG. 5B is a flow chart illustrating the steps taken by the image analysis of the controller to produce an inference on the contents of the collected waste.
Figure 5B:
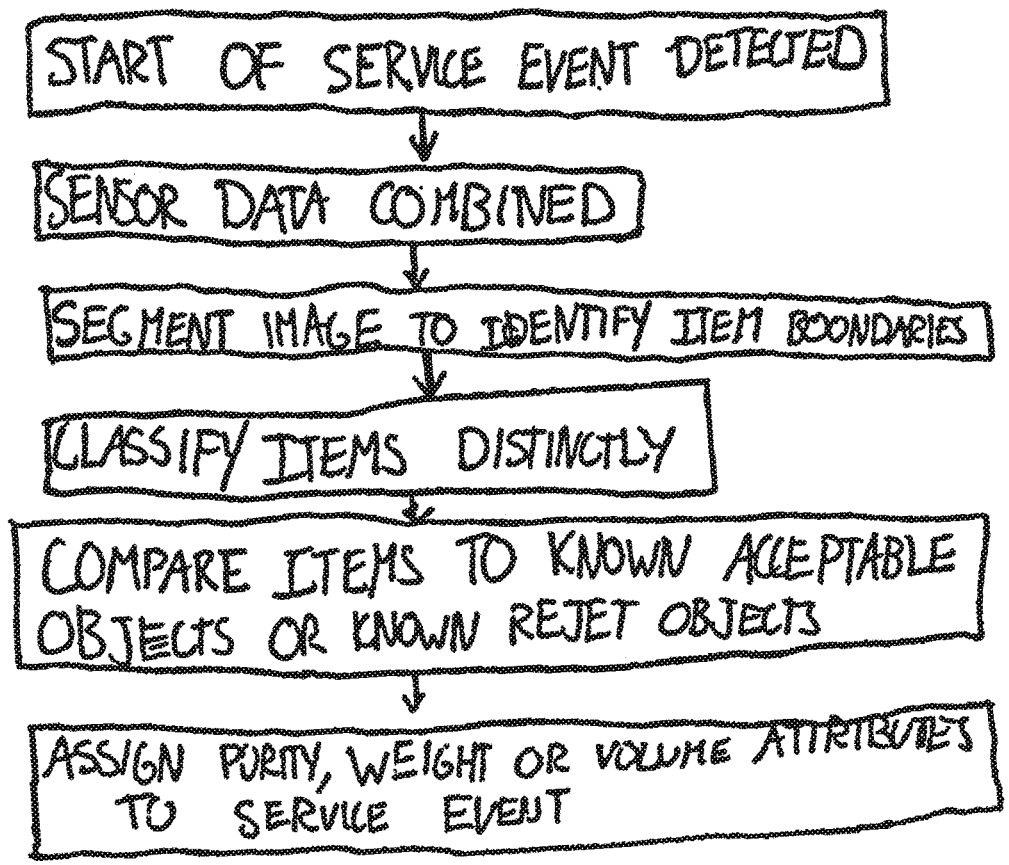

The onboard controller is then able to make inferences relating to the contents of the waste appearing in the waste images as represented by the steps in FIG. 5B. The inference regarding the contents of the waste collected at a service event correspond to a numerical measure of purity, for example a measure of the quality of refuse or the overall amount of acceptable material relative to the total amount of material collected at the service event. This may be expressed as a percentage of refuse which is deemed to be of acceptable quality for recycling. In the instance where individual objects are identified within the image data and the objects can be further determined to be acceptable or rejected objects, the measure of purity corresponding to waste associated with a service event may be a ratio of acceptable objects to rejected objects or acceptable objects relative to a total number of identified objects. Furthermore, each of the identified objects may be associated with a weight or a volume such that the measure of purity may instead relate to a percentage of acceptable material by weight or a percentage of acceptable material by volume relative to the entire weight or volume of waste material collected at the service event.

The measure of purity of the waste may further include a correction for the quality of each identified object. For example, acceptable objects may be deemed partly or wholly unacceptable if the object is considered contaminated or if the object is not intact or only partly represented in broken pieces.

In preferred embodiments, the system merely evaluates the total weight or volume of unacceptable objects and provides a purity measure on the basis of the total rejected content associated with a service event.

Within each waste image associated with a service event, the image analysis involves identifying boundaries and grouping the boundaries to form shapes of identified objects. Boundaries may be determined by different colours, textures or other visual information. In further instances, data from other optical sensors, for example LIDAR, may be used to capture additional data relating to the contents in the waste receiving area associated with each image. In the instance of LIDAR, the data from the additional sensor provides a mapping of three-dimensional surfaces such that intersecting surfaces can be identified as boundaries of different objects to assist in separating the image content of the waste images into identifiable objects.

Once the controller has identified distinct objects within each waste image, the identified objects are compared to known acceptable objects and known rejected objects to classify the identified object as acceptable or rejected objects. Unidentifiable or indeterminate objects identified within the waste images can be deemed rejected objects for purposes of calculating the measure of purity of the waste content as a whole.

If one of the identified objects within the waste images is deemed to be sufficiently similar to a critical object stored on the controller, the overall contents may be immediately deemed rejected.

Once all of the identified objects within the images have been classified as acceptable or rejected objects by similarity comparison to known objects stored on the controller, an overall rating of purity can be made with regard to the contents associated with a service event. In instances where the purity measure relates to volume or mass, the known objects stored on the controller may have associated known weight or known volume stored on the controller which can be used as the presumptive weight or volume of the identified object.

Once a measure of the overall acceptability of the contents associated with one service event has been calculated, this measure of purity can be compared to one or more classification thresholds to determine if the waste contents of a service event pass in entirety, are partly rejected, or are entirely rejected. Identification of a critical object may supersede the classification and result in the entirety of the waste contents of one service event being rejected.

Once an overall assessment of the purity or weight or volume of the waste contents has been made, this inference is assigned to the client that has been identified with the service event by the identification system. All of this data is stored on the service vehicle or on the server to permit subsequent recall by an administrator in communication over the network with one or both of the onboard controller or the server controller. Individual clients also have access through a respective client application executed on a client computer device which communicates with the server over the communications network as shown in FIG. 1.

Figure 6A:
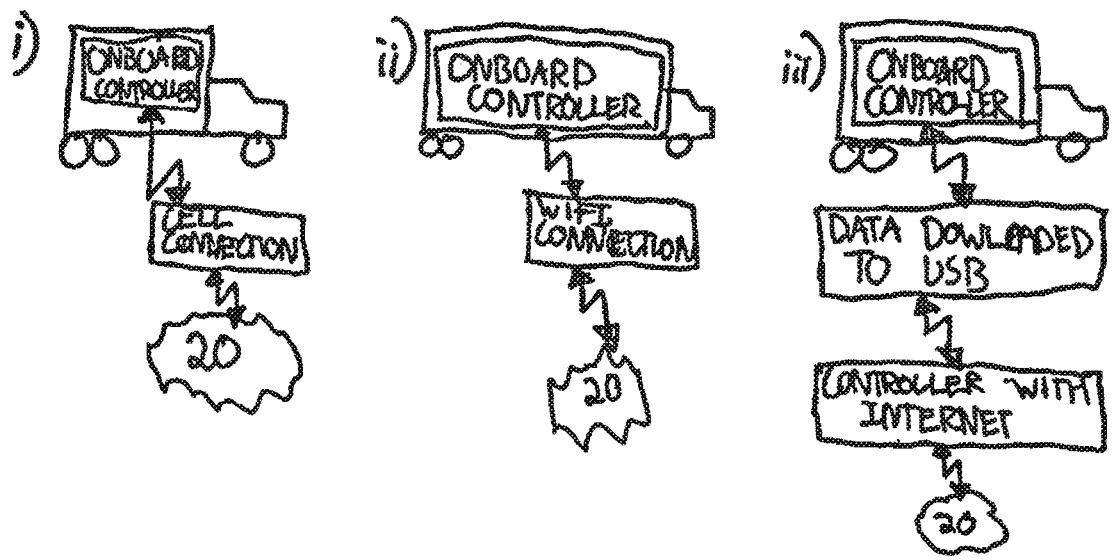
FIG. 6A is a schematic representation of different communication systems of the service vehicle and FIG. 6B is a flow chart illustrating the steps taken by the onboard controller to report data to a central server of the waste management system.
Figure 6B:
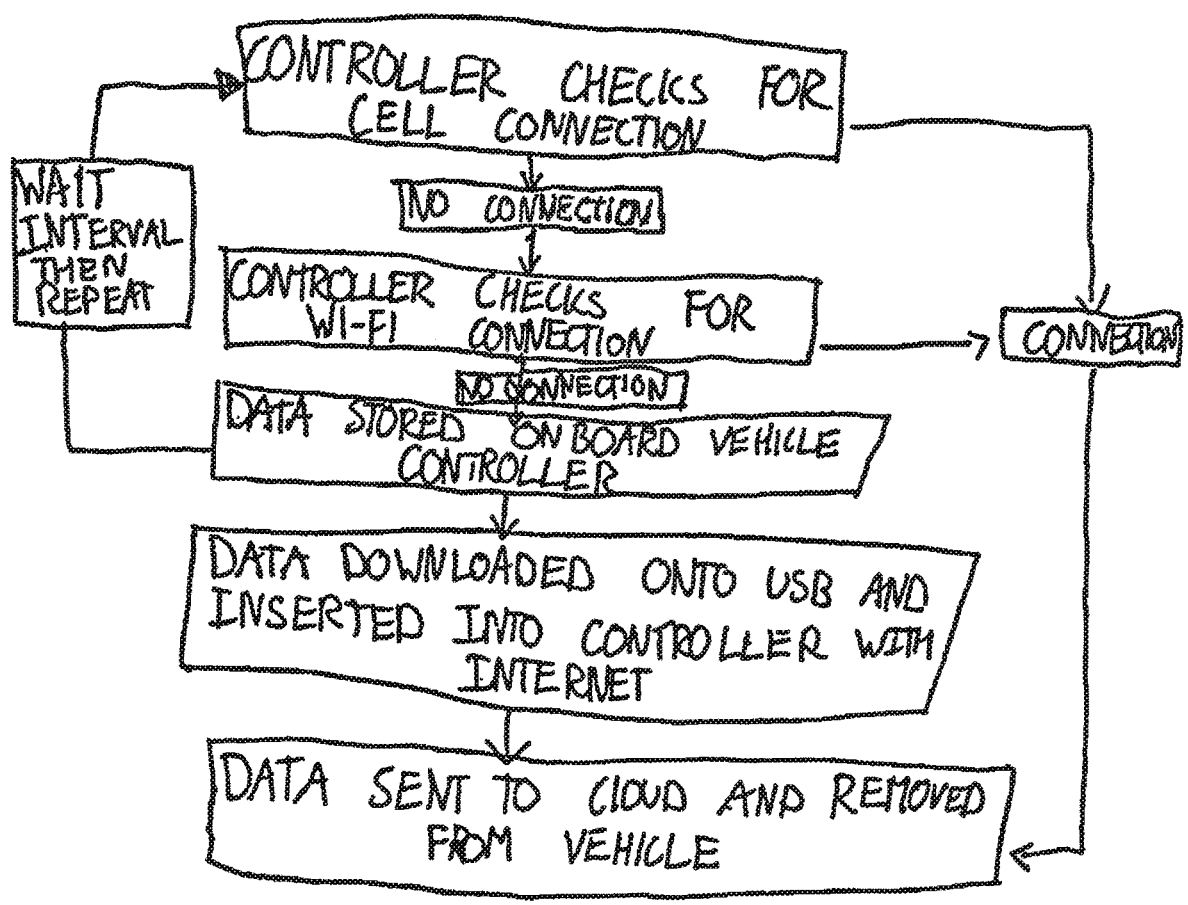

As represented in FIG. 6B, the various data related to collection events including captured waste images and the identification of an associated client is collected in real time and stored on the onboard controller. The remaining analysis of the data may be performed in real-time on the service vehicle, or the data may be communicated in real-time to the central server for subsequent analysis at the central server, or yet further the data may remain stored on the service vehicle to be transferred to the central server at a later date for analysis.

In addition to identifying individual objects within each waste image, the controller is further able to identify the position of each identified object within the waste receiving area 28 of the image and then track the movement of the identified object within the waste receiving area of the vehicle is the waste material is compacted or as additional waste material is added to the waste receiving area. The controller stores all of the identified objects such that when a new service event is determined, subsequent images associated with the new service event are analysed to identify objects associated with the previous service event. Any objects that are identified as being associated with the previous service event are removed from the current audit and remain associated with the previous service event and previously identified client associated with the previous service event. Any new objects identified within the waste images are further analysed for comparison to known objects. Any thresholds that are used to perform a similarity comparison are only performed on the newly identified objects. This results in the measure of acceptable or rejected waste objects within the current service event being based only on the newly identified objects associated with that service event.

The identification of objects within the waste receiving area of the waste images, the comparison of the identified objects to various known objects stored on the controller and use of additional sensor data to qualify the objects being identified all collectively defined content criteria which is used to make an inference on the content of the waste collected within a prescribed service event is represented in FIG. 5. Once an inference has been made, the inferences stored with the identified client and all associated waste images associated with that service event are also stored. This information can be recalled by the relevant client using the client application or by an administrator at any time in the future to validate billing information.

System is capable of generating an invoice which is variable based on the purity measure.

Further details with regard to the function of the system will now be described. The actual technical process for waste classifications starts with the controller initiating a first process to connect to the camera. The controller then analyzes image data in real-time and recognizes the start of the service activity. The controller then saves the sensor data to a unique folder for that service activity. Use of GPS, a barcode scan, RFID, or a known list of planned sequential service events can be used so that this data can be associated with a specific client. A secondary sensor, for example LIDAR, infrared, radar, stereoscopic camera, or load sensor, may be used to add additional data. In the instance of a load sensor, it could be provided within a hydraulic arm for lifting the waste containers, within the refuse deposit area, or within the hopper area.

According to one optional process, the controller may execute a second process triggered either by completion of the first process or by continuously running in real-time to check for an Internet connection, for example through a cellular network a Wi-Fi network or other, and then packages collected data for sending to the cloud for further processing. The cloud controller receives the data from the service vehicle and analyses it to make a recommendation. The recommendation is then available for review by one of the following including the specific client being service, the waste service provider, or the organization responsible for administering actions of the waste service provider.

According to a second optional process, the controller may execute a second process either triggered by completion of the first process or by continuously running in real-time to analyse the data collected by the system and to make a recommendation using the sensor data. The controller then executes a third process which is either triggered by completion of the previous process or in a continuously running manner, to check for an Internet connection, for example a cellular network, and Wi-Fi network or other, and sends the previous analysis to the cloud system. The cloud controller then receives the data from the service vehicle and stores the recommendation. The recommendation is then available for review by any one of: a specific client being serviced, a waste service provider, or an organization responsible for administering actions of the waste service provider. The recommendation in question could either be regarding the object classified or the total volume of refuse collected. The client may be billed variably depending on their waste generation and sorting abilities.

Following a collection of baseline data, an auditor, for example an administrator or a third-party hired by the service provider or service provider personnel, reviews the data to understand which clients are producing larger amounts of waste and/or sorting their organics/recycling improperly. The route list is generated of these identified short listed clients. The auditor drives this route and manually inspects this short list. Clients who have been witnessed having infractions at this time have their bins or waste containers flagged for the infraction. When a refuse collection driver sees these flagged bins they do not provide service.

The contamination system process overall includes (i) a service event detection process, (ii) a material tracking, segmentation and classification process, (iii) an individual inference process, (iv) a summarization inference process, and (v) an administrative reporting process as described in the following.

The service event detection process has the goal of detecting the start and end of a service event. It may be triggered by always running to detect the incoming presence of the bin or lever arm within a designated field-of-view, and/or detect the absence of a bin or lever arm within a designated field-of-view.

The material tracking, segmentation and classification process has a goal of tracking all current material within the hopper and classifying new material. This process is triggered by the detection of a service event or if substantially new material is detected within the bin. The steps include segmenting the image into numerous separate items, in which segmentation may be assisted by additional sensors including Lidar, secondary RGB camera, and/or a stereoscopic camera. Classification of each segmented material uses image item features but isn't limited to size, shape, colour and/or branding. Based on previous item tracking and current hopper contents all new material is assigned and classified to the most recent service event. Position is tracked for each material so that positions are known prior to the next service event.

The individual inference process has a goal of identifying purity, volume and weight of each item collected. It is triggered by the detection of new material in the previous process. This process compares material classified in the previous step to a known list of accepted materials for the collection route. If identified material is not on the list, it is classified as contaminated. If material has a cleanliness element to it, the material may be further classified if it appears clean. If the material is not clean, it is classified as contaminated. An example of a contaminated item is a recyclable jar including residual food such as peanut butter contained therein. This process uses known material types and shapes to estimate volume and weight.

The summarization inference process has a goal of creating an overall score to be assigned back to an individual client. It is triggered when all individual inferences for a particular service event have been completed. The process summarizes all individual inferences for list of materials collected, and the total volume and weight. This may be assisted by use of load sensors that previously determined weight of material during a service event on the loading arm or in the bed of the hopper. Service events are assigned into a sorting tier in which the tiers may include acceptable, improvement needed, or negligent. If a critical item is detected, for example a dirty peanut butter jar, dirty diaper, propane tank and the like, the service event is immediately assigned to a negligent status. If no critical items are detected, the tier is based on a percent of contaminated load. Examples that contaminate a load but are not negligent include black plastic material, or any other non-accepted plastic type. The service event must be below 0.5% contamination to be deemed acceptable.

The administrative reporting process has a goal for administrators to proactively forecast each refuse stream amount, identify trends in contamination levels and overall diversion rates and are alerted to negligent clients that need intervention. Administrators can start campaigns or focused outreach events to a specific subset of clients, for example based on geographic, demographic or performance level, and track the impact. Campaigns could be doorstep education activities, pamphlet drops, or targeted social media campaigns for example. Actual means to accomplish the goals will be multiple screens within a web portal and software functions to aggregate summarized inferences by region, demographic or previous performance level for example.

The system as a whole described herein provides a system for auditing waste retrieved by service vehicles that generally includes the following: (i) an optical sensor configured to conditionally record image data during waste collection services; (ii) a controller (controller 'A') capable of analyzing optical sensor data in real time and conditionally record data if a unique service event is detected; (iii) a controller (controller 'B) capable of using this data to make an inference regarding the purity, volume or weight of collected refuse; (iv) a location system able to identify the truck's current position; (v) an identification system capable of using the location system to identify current client.

Data from additional sensors including LIDAR, Radar, Infrared, stereoscopic camera or load sensor) may be used in the inference.

Controller B may be either onboard the service vehicle or a cloud based controller which receives data generated by controller A.

The data collected and inference generated by controller B can be reviewed and modified by a user using either: a display within the service vehicle, or a remote system and remote operator.

The location system may utilize a GPS on the truck.

The identification system may be further enhanced by utilizing: a barcode on the bin, an RFID tag on the bin, or a planned route the collection vehicle. The load sensor may be connected to the lifting arm, refuse deposit area of hopper area.

The volume and purity inference may be used to generate a variable bill rate applied to the customer.

Data from all sensors may be used to generate a variable bill rate.

The system may further use at least two inferences that are compared to create a trend for the client's purity, volume and weight characteristics compared against a threshold and this information is then used to generate optimum refuse collection vehicle routes providing service to a subset of clients.

The inference can be compared against a threshold in regarding either purity, volume or weight.

The purity may be in regard to possible contamination with waste stream, or possible quality characteristics such a spoiled food waste.

The waste containers may be monitored using data collected during the service event.

The optical sensors may be automatically capable of detecting and recording data regarding the state of the waste container including but not limited to if a container is broken, misplaced, or overflowing or this data is manually entered by an operator.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A waste management system for auditing waste collected by a service vehicle from an identified client among a plurality of clients, the system comprising:
    a camera arranged to capture waste images of the waste collected by the service vehicle;
    a controller including a processor and a memory storing programming instructions thereon arranged to be executed by processor such that the controller is arranged to:
        (i) compare the waste images captured by the camera to event criteria to determine if a service event has occurred;
        (ii) associate the service event with the identified client;
        (iii) identify one or more waste images among the waste images captured by the camera as event image data associated with the service event subsequent to determination that the service event has occurred;
        (iv) compare the event image data to content criteria to make an inference regarding a content of the collected waste; and
        (v) store the inference in association with the identified client.

2. The waste management system according to claim 1 wherein the camera is arranged to capture the waste images such that each waste image includes a waste receiving area of the service vehicle and a peripheral area in an adjacent field of view relative to the waste receiving area, and wherein the event criteria includes identification of an object within the peripheral area by the controller.

3. The waste management system according to claim 2 wherein the service vehicle includes a loading arm which unloads the waste from waste containers into the waste receiving area of the service vehicle and wherein the object identified in the peripheral area is the loading arm of the service vehicle.

4. The waste management system according to claim 2 wherein the service vehicle receives the waste into the waste receiving area of the service vehicle from waste containers and wherein the object identified in the peripheral area is a currently unloading waste container among the waste containers.

5. The waste management system according to claim 2 wherein the event criteria include determining a start of the service event based upon emergence of the object within the peripheral area.

6. The waste management system according to claim 2 wherein the event criteria include determining an end of the service event based upon disappearance of the object within the peripheral area.

7. The waste management system according to claim 2 wherein the event criteria include a change threshold applied to a comparison of the waste receiving area of sequential images among the waste images captured by the camera.

8. The waste management system according to claim 1 further comprising:
    the camera being arranged to capture the waste images from a waste receiving area of the service vehicle;
    the controller being arranged to (i) identify waste objects within the waste images, (ii) track the identified waste objects from a previous service event within the waste receiving area, and (iii) distinguish current identified waste objects associated with the current service event from the identified waste objects of the previous service event; and
    the event criteria including a change threshold applied to a comparison of identified waste objects of sequential images among the waste images captured by the camera.

9. The waste management system according to claim 1 further comprising:
    the controller being arranged to identify objects within the waste images;
    the content criteria including a similarity comparison of each identified object to a plurality known objects stored on the controller;
    the controller being arranged to make the inference based on the similarity comparisons of all identified objects.

10. The waste management system according to claim 9 wherein the known objects comprise approved objects, the controller being arranged to make a positive inference that the content of the collected waste is approved if an amount of the identified objects matching the approved objects by similarity comparison exceeds an approval threshold.

11. The waste management system according to claim 10 wherein the controller is further arranged to (i) assign identified objects that do not meet a similarity comparison to the known objects as rejected objects, and (ii) make a negative inference that the content of the collected waste is rejected if an amount of the identified objects matching the rejected objects by similarly comparison exceeds a rejection threshold.

12. The waste management system according to claim 9 wherein the known objects comprise rejected objects, the controller being arranged to make a negative inference that the content of the collected waste is rejected if an amount of the identified objects matching the rejected objects by similarly comparison exceeds a rejection threshold.

13. The waste management system according to claim 9 wherein the controller is arranged to identify objects by determining object boundaries within the waste images to determine shape of the object.

14. The waste management system according to claim 13 further comprising a secondary sensor arranged to map three dimensional surfaces within a waste receiving area of the service vehicle from which the waste images are captured, the controller being arranged to use the mapped three dimensional surfaces from the secondary sensor in defining the identified objects within the waste images.

15. The waste management system according to claim 14 wherein the secondary sensor comprises LIDAR.

16. The waste management system according to claim 9 wherein the similarity comparison is arranged to determine one of the identified objects is one of the known objects if brand imagery is identifiable on the identified object that corresponds to known imagery associated with the known object.

17. The waste management system according to claim 1 further comprising:
    the camera being arranged to capture the waste images from a waste receiving area of the service vehicle;
    the controller being arranged to (i) identify waste objects within the waste images, (ii) distinguish current identified waste objects associated with a current service event from the identified waste objects of a previous service event, and (iii) apply the content criteria only to the currently identified waste objects associated with the current service event in making the inference regarding the content of the collected waste.

18. The waste management system according to claim 17 wherein the controller is further arranged to track a position of the identified waste objects from a previous service event within the waste receiving area in order to distinguish the currently identified waste objects from the identified waste objects of the previous service event.

19. The waste management system according to claim 1 wherein the controller is arranged to identify waste objects within the waste images by comparison to known objects stored on the controller, and use one or both of a known weight or a known volume associated with the known objects that are identified in making the inference regarding the content of the collected waste.

20. The waste management system according to claim 1 further comprising a load sensor arranged to measure a weight of the waste collected by the service vehicle, the controller being arranged to use the measured weight in making the inference of the content of the collected waste.

21. The waste management system according to claim 1 wherein the inference includes a measure of a purity of the collected waste and the controller is arranged to compare the measured purity to a purity threshold to classify the service event according to the measure of purity.

22. The waste management system according to claim 21 wherein the controller is arranged to (i) identify objects within the waste images and compare the identified objects to the content criteria in measuring the purity, (ii) compare the identified objects to known critical objects stored on the controller, and (iii) supersede the classification with a rejection if one of the identified objects is determined to be one of the known critical objects.

23. The waste management system according to claim 1 further comprising an identification system arranged to identify said identified client being serviced among the plurality of clients, wherein the identification system includes a vehicle location identifier and is arranged to identify the client being serviced by comparing the identified location of the vehicle to known client locations of the clients.

24. The waste management system according to claim 1 wherein the identification system includes a vehicle sensor arranged to sense movement information related to the service vehicle, and wherein the identification system is arranged to identify the client by comparison of the movement information to a known service route stored on the controller.

25. The waste management system according to claim 24 wherein the vehicle sensor includes one or more wheel sensors arranged to detect wheel movement of wheels of the service vehicle.

26. The waste management system according to claim 24 wherein the vehicle sensor includes an accelerometer.

27. A waste management system for auditing waste collected by a service vehicle from a plurality of clients, the system comprising:
a camera arranged to capture waste images of the waste collected by the service vehicle, the camera is being arranged to capture the waste images such that each waste image includes a waste receiving area of the service vehicle and a peripheral area in an adjacent field of view relative to the waste receiving area;
a controller including a processor and a memory storing programming instructions thereon arranged to be executed by processor such that the controller is arranged to:
(i) compare said waste images captured by the camera to event criteria to determine if a service event has occurred;
(ii) identify a client among the plurality of clients as being serviced by the service vehicle by identifying one or more landmarks in the peripheral area of said waste images captured by the camera from known landmarks associated with a known service route stored on the controller;
(iii) subsequent to determination that the service event has occurred, identify one or more waste images among said waste images captured by the camera as event image data associated with the service event;
(iv) compare the event image data to content criteria to make an inference regarding a content of the collected waste; and
(v) store the inference in association with the identified client.

28. The waste management system according to claim 1 wherein the controller is arranged to make the inference so as to include a quantity measure and a quality measure relating to the collected waste, and wherein the controller is arranged to generate a variable waste collection invoice based upon the quantity measure and the quality measure of the inference.

29. A waste management system for auditing a service event in the form of waste collected by a service vehicle from an identified client among a plurality of clients, the system comprising:
a camera arranged to capture waste images of the waste collected by the service vehicle;
a controller including a processor and a memory storing programming instructions thereon arranged to be executed by processor such that the controller is arranged to:
(i) identify one or more waste images among the waste images captured by the camera as event image data associated with the service event;
(ii) identify waste objects in the event image data;
(iii) individually measure a quality of identified waste objects by comparison of the waste object to content criteria including known object data stored on the controller;
(iv) make an inference regarding a content of the collected waste of the service event, the inference including a measure of purity of the collected waste based on the individually measured quality of the identified waste objects in the event image data associated with the service event; and
(v) store the inference in association with the identified client.

* * * * *